(12) United States Patent
Geng (10) Patent No.: US 11,412,326 B2
(45) Date of Patent: Aug. 9, 2022

(54) METHOD AND DEVICE FOR PROCESSING AN AUDIO SIGNAL IN A VEHICLE

(71) Applicant: Baidu Online Network Technology (Beijing) Co., Ltd, Beijing (CN)

(72) Inventor: Lei Geng, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/920,823

(22) Filed: Jul. 6, 2020

(65) Prior Publication Data

US 2020/0336827 A1    Oct. 22, 2020

Related U.S. Application Data

(63) Continuation of application No. 16/554,222, filed on Aug. 28, 2019, now Pat. No. 10,785,566.

(30) Foreign Application Priority Data

Dec. 5, 2018  (CN) .......................... 201811480650.5

(51) Int. Cl.
*H04R 3/00* (2006.01)
*H04R 3/04* (2006.01)
(Continued)

(52) U.S. Cl.
CPC .......... *H04R 3/005* (2013.01); *B60R 11/0247* (2013.01); *G10L 21/0216* (2013.01);
(Continued)

(58) Field of Classification Search
CPC ................ H04R 3/005; H04R 2499/13; H04R 2430/01; H04R 2201/401; H04R 2430/21;
(Continued)

(56) References Cited

U.S. PATENT DOCUMENTS

2006/0262935 A1*  11/2006  Goose ...................... H04S 3/002
                                                                    381/17
2010/0189275 A1*  7/2010  Christoph .............. H04R 3/005
                                                                    381/66

(Continued)

FOREIGN PATENT DOCUMENTS

CN         104661150 A        5/2015
CN         105700392 A        6/2016
                (Continued)

OTHER PUBLICATIONS

Office Action dated Aug. 28, 2019 for Chinese Application No. 201811480650.5.

(Continued)

*Primary Examiner* — Norman Yu
(74) *Attorney, Agent, or Firm* — Neal, Gerber & Eisenberg LLP (57) ABSTRACT

A method and a device for processing an audio signal in a vehicle are provided. The method includes: obtaining an audio signal by a microphone array; performing echo cancellation on the obtained audio signal, to obtain a first processed signal; and performing beamforming on the first processed signal according to sound zones in which microphones of the microphone array are located, to obtain a second processed signal, wherein the vehicle includes at least two sound zones, and each microphone of the microphone array is located in at least one sound zone. With the beamforming, the requirements for isolation degree between different sound zones is not high, and the sound source of the audio signal can be accurately determined.

9 Claims, 6 Drawing Sheets

(51) Int. Cl.
*H04R 5/04* (2006.01)
*H04R 5/027* (2006.01)
*B60R 11/02* (2006.01)
*G10L 21/0216* (2013.01)
*G10L 21/0208* (2013.01)

(52) U.S. Cl.
CPC ............... *H04R 3/04* (2013.01); *H04R 5/027* (2013.01); *H04R 5/04* (2013.01); *G10L 2021/02082* (2013.01); *G10L 2021/02166* (2013.01); *H04R 2499/13* (2013.01)

(58) Field of Classification Search
CPC ............ H04R 2410/05; H04R 2430/20; H04R 2203/12; H04R 2410/00; H04R 2410/01; H04R 2201/40; H04R 3/04; H04R 5/027; H04R 5/04; G10L 2021/02166; G10L 21/0208; G10L 2021/02082; G10L 21/02; G10L 21/0364; G10L 21/0216; H04S 7/303; H04S 2400/15; H04S 7/302; H04S 7/305; H04S 7/30; G10K 2210/505; G10K 2210/111; G10K 2210/12; G10K 2210/1282; B60R 11/0247
USPC ............................... 381/86, 303, 71.4, 92, 26
See application file for complete search history.

(56) References Cited

U.S. PATENT DOCUMENTS

| | | | |
|---|---|---|---|
| 2016/0196818 A1* | 7/2016 | Christoph | H04K 3/43 381/71.6 |
| 2017/0169836 A1 | 6/2017 | Buck et al. | |
| 2019/0313187 A1* | 10/2019 | Stoltze | H04R 3/04 |
| 2019/0364359 A1* | 11/2019 | Ferguson | G10L 21/028 |

FOREIGN PATENT DOCUMENTS

| | | |
|---|---|---|
| CN | 106601245 A | 4/2017 |
| CN | 106910510 A | 6/2017 |
| CN | 206312566 U | 7/2017 |
| CN | 107889029 A | 4/2018 |
| CN | 108538305 A | 9/2018 |
| CN | 108834030 A | 11/2018 |

OTHER PUBLICATIONS

Search Report dated Aug. 19, 2019 for Chinese Application No. 201811480650.5.

* cited by examiner

METHOD AND DEVICE FOR PROCESSING AN AUDIO SIGNAL IN A VEHICLE

CROSS-REFERENCE TO RELATED APPLICATIONS

This application is a continuation of U.S. patent application Ser. No. 16/554,222, filed on Aug. 28, 2019, which claims priority to Chinese Patent Application No. 201811480650.5, filed on Dec. 5, 2018, the entire contents of both of which are hereby incorporated by reference.

TECHNICAL FIELD

The present disclosure relates to the field of voice control technology, and in particular, to a method and a device for processing an audio signal in a vehicle.

BACKGROUND

In the current automobile market, an on-board microphone collects voice only at a fixed position for a main driver in a vehicle, such as a position of a main control console or an overhead light of the vehicle, and is mainly applied to an on-board phone application. In recent years, smart vehicles are increasingly in popularity. Compared with a traditional vehicle, an on-board entertainment system of the smart vehicle is intelligent, networked and personalized in functions, which can obtain multimedia information from the Internet and display them through an on-board large screen.

The existing on-board microphone is generally installed only at a position of an overhead light, a central console or an A pillar of a vehicle, and can only collect sound in a seating area for a driver. This single-zone sound collecting device and its particular position cannot meet a future Internet on-board system, such that an on-board voice recognition system cannot provide service to passengers other than the main driver, let alone provide service to each passenger simultaneously. In addition, the noise reduction effect of the existing microphone is not ideal, and the noise reduction cannot be performed well on some non-human sound (such as sound of opening or closing a vehicle door, engine sound, tire noise and so on). If it is necessary to provide a voice recognition service for each seating area of the whole vehicle, a plurality set of microphone arrays are required to achieve the sound collecting effect in each seating area of the whole vehicle.

SUMMARY

A method and a device for processing an audio signal in a vehicle are provided according to embodiments of the present disclosure, so as to at least solve one or more technical problems in the existing technology.

In a first aspect, a method for processing an audio signal in a vehicle is provided according to an embodiment of the present application, the method includes:
obtaining an audio signal by a microphone array;
performing echo cancellation on the obtained audio signal, to obtain a first processed signal; and
performing beamforming on the first processed signal according to sound zones in which microphones of the microphone array are located, to obtain a second processed signal, wherein the vehicle includes at least two sound zones, and each microphone of the microphone array is located in at least one sound zone.

In one possible implementation, the method further includes:
performing noise reduction and signal amplification on the second processed signal, to obtain a third processed signal, and sending the third processed signal to an on-board operation system of the vehicle, to control the vehicle in response to the third processed signal.

In one possible implementation, the method further includes:
setting the sound zones in which respective microphones of the microphone array is located, based on a topology of the microphone array.

In one possible implementation, the setting the sound zones in which respective microphones of the microphone array is located, based on a topology of the microphone array includes at least one of:
determining a first microphone as a microphone in common with the sound zones, setting a sound zone in which a second microphone is located to a first sound zone, and setting a sound zone in which a third microphone is located to a second zone, wherein the microphone array is a triangle including at least three microphones; and
determining each microphone of the microphone array to be located in at least one sound zone, wherein the microphone array is an N-gon, a circle, or a matrix including a plurality of microphones, and N is an integer greater than 3.

In one possible implementation, the performing beamforming on the first processed signal according to sound zones in which microphones of the microphone array are located, includes:
performing the beamforming on the first processed signal based on the sound zone in which each microphone of the microphone array is located and a time when each microphone receives the audio signal, to determine a sound zone in which a sound source of the audio signal is located.

In one possible implementation, the method further includes:
for each microphone of the microphone array,
determining a location of a sound source of the audio signal received by the microphone, to determine a sound zone in which the sound source is located;
comparing the determined sound zone with the sound zone in which the microphone is located, to determine whether the determined sound zone is identical with the sound zone in which the microphone is located; and
in a case that the determined sound zone is not identical with the sound zone in which the microphone is located, calibrating the sound zone in which the microphone is located by the determined sound zone.

In one possible implementation, the sending the third processed signal to an on-board operation system of the vehicle, includes:
sending the third processed signal to the on-board operation system of the vehicle via an Automotive Audio Bus.

In a second aspect, a device for processing an audio signal in a vehicle is provided according to an embodiment of the present application, the device includes:
a signal obtaining module configured to obtain an audio signal by a microphone array;
an echo cancellation module configured to perform echo cancellation on the obtained audio signal, to obtain a first processed signal; and
a beamforming module configured to perform beamforming on the first processed signal according to sound zones in which microphones of the microphone array are located, to obtain a second processed signal, wherein the vehicle includes at least two sound zones, and each microphone of the microphone array is located in at least one sound zone.

In one possible implementation, the device further includes:

a signal sending module configured to perform noise reduction and signal amplification on the second processed signal, to obtain a third processed signal, and send the third processed signal to an on-board operation system of the vehicle, to control the vehicle in response to the third processed signal.

In one possible implementation, the device further includes:

a sound zone setting module configured to set the sound zones in which respective microphones of the microphone array is located, based on a topology of the microphone array.

In one possible implementation, the sound zone setting module is further configured to set the sound zones in which respective microphones of the microphone array is located based on a topology of the microphone array by at least one of:

determining a first microphone as a microphone in common with the sound zones, setting a sound zone in which a second microphone is located to a first sound zone, and setting a sound zone in which a third microphone is located to a second zone, wherein the microphone array is a triangle including at least three microphones; and determining each microphone of the microphone array to be located in at least one sound zone, wherein the microphone array is an N-gon, a circle, or a matrix including a plurality of microphones, and N is an integer greater than 3.

In one possible implementation, the beamforming module is further configured to perform the beamforming on the first processed signal based on the sound zone in which each microphone of the microphone array is located and a time when each microphone receives the audio signal, to determine a sound zone in which a sound source of the audio signal is located.

In one possible implementation, the device further includes:

a localizing module configured to, for each microphone of the microphone array, determine a location of a sound source of the audio signal received by the microphone, to determine a sound zone in which the sound source is located;

a comparing module configured to, for each microphone of the microphone array, compare the determined sound zone with the sound zone in which the microphone is located, to determine whether the determined sound zone is identical with the sound zone in which the microphone is located; and a calibrating module configured to, for each microphone of the microphone array, in a case that the determined sound zone is not identical with the sound zone in which the microphone is located, calibrate the sound zone in which the microphone is located by the determined sound zone.

In one possible implementation, the signal sending module is further configured to send the third processed signal to the on-board operation system of the vehicle via an Automotive Audio Bus.

In a third aspect, an apparatus for processing an audio signal in a vehicle is provided according to an embodiment of the present application. The functions of the apparatus may be implemented by hardware, or by hardware executing corresponding software. The hardware or software includes one or more modules corresponding to the above functions.

In a possible design, the structure of the apparatus includes:

a microphone array, configured to collect an audio signal; and a controller including a processor and a storage, the storage is configured to store a program for supporting the above method for processing an audio signal in a vehicle, executed by the apparatus, the processor is configured to execute the program stored in the storage. The apparatus further includes a communication interface configured for communication between the apparatus and another apparatus or communication network.

In a fourth aspect, a computer-readable storage medium is provided according to an embodiment of the present application, for storing computer software instructions used by the device for processing an audio signal in a vehicle, the computer software instructions include programs involved in execution of the above method for processing an audio signal in a vehicle.

One of the above technical solutions has the following advantages or beneficial effects.

A sound zone in which each microphone in a microphone array is located can be set in advance, so that the beamforming can be performed on an audio signal directly by using the sound zone in which each microphone is located. With such beamforming, the requirements for isolation degree between different sound zones is not high, and a sound source of the audio signal can be accurately determined.

The above summary is for the purpose of the specification only and is not intended to be limiting in any way. In addition to the illustrative aspects, embodiments, and features described above, further aspects, embodiments, and features of the present application will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed in accordance with the present application and are not to be considered as limiting the scope of the present application.

DETAILED DESCRIPTION

In the following, only certain exemplary embodiments are briefly described. As those skilled in the art would realize, the described embodiments may be modified in various different ways, all without departing from the spirit or scope of the present application. Accordingly, the drawings and description are to be regarded as illustrative in nature and not restrictive.

Figure 1:
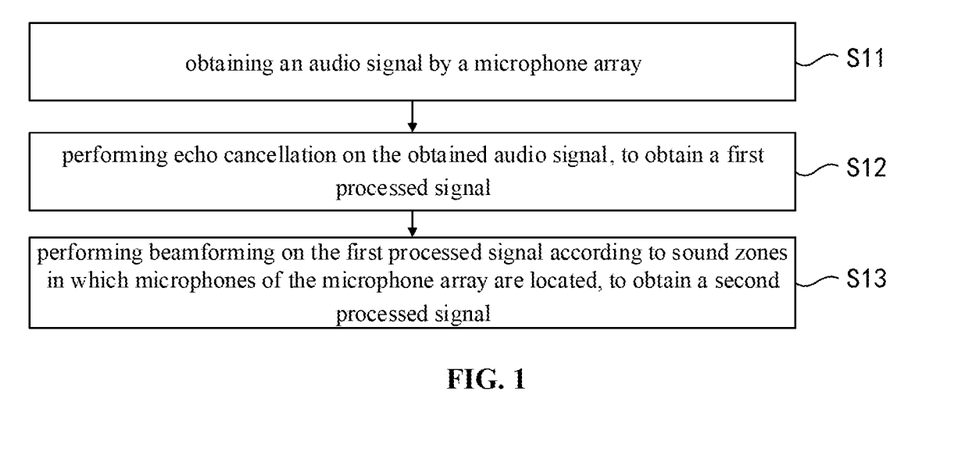
FIG. 1 shows a flowchart of a method for processing an audio signal in a vehicle according to an embodiment of the present application.

FIG. 1 shows a flowchart of a method for processing an audio signal in a vehicle according to an embodiment of the present application. As shown in FIG. 1, the method includes:

S11: obtaining an audio signal by a microphone array;

S12: performing echo cancellation on the obtained audio signal, to obtain a first processed signal; and S13: performing beamforming on the first processed signal according to sound zones in which microphones of the microphone array are located, to obtain a second processed signal, wherein the vehicle includes at least two sound zones, and each microphone of the microphone array is located in at least one sound zone.

Figure 2:
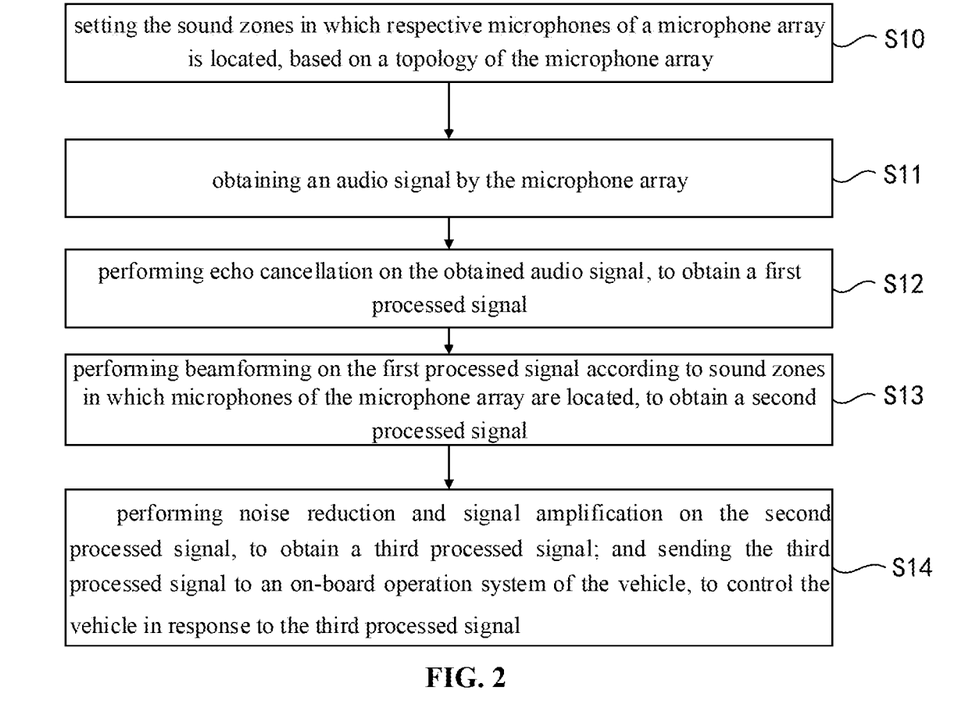
FIG. 2 shows a flowchart of a method for processing an audio signal in a vehicle according to an embodiment of the present application.

In one possible implementation, as shown in FIG. 2, the method further includes:

S14: performing noise reduction and signal amplification on the second processed signal, to obtain a third processed signal, and sending the third processed signal to an on-board operation system of the vehicle, to control the vehicle in response to the third processed signal.

The vehicle typically includes a driver seating area, a co-driver seating area, and a rear passenger seating area. A microphone array is arranged in the vehicle. The microphone array typically includes a plurality of microphone sensors (hereinafter referred to as microphones) that can be placed at respective spatial locations of the seating areas in a certain manner, to receive respective audio signals at the respective spatial locations. The microphone array can have a variety of topologies, such as a triangle, a circle, a polygon and a matrix, depending on the number of microphones and a distribution of the microphones. For different topologies of the microphone array, the sound zone in which each microphone is located can also have different setting modes.

In one possible implementation, as shown in FIG. 2, the method further includes:

S10: setting the sound zones in which respective microphones of the microphone array is located, based on a topology of the microphone array.

In one possible implementation, S10 includes at least one of the following modes.

Mode 1: if the microphone array is a triangle composed of three microphones, a first microphone is used as a common microphone, a second microphone and the first microphone are set to be located in a first sound zone, and a third microphone and first microphone are set to be located in a second sound zone.

Figure 5:
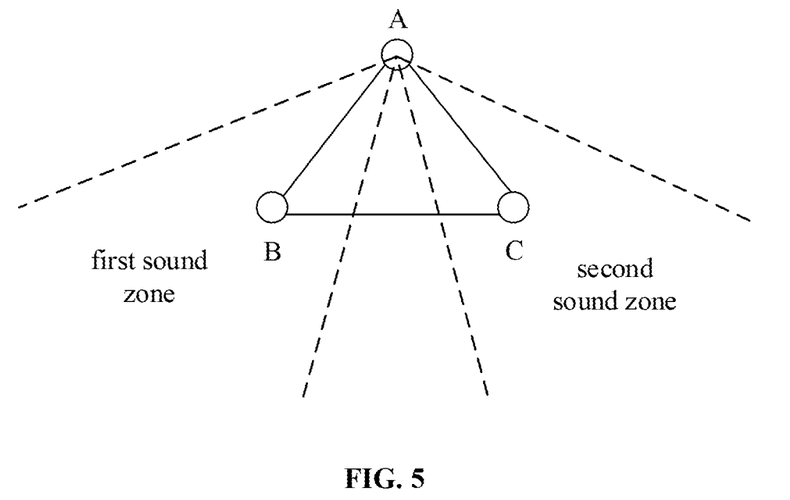
FIG. 5 shows a schematic diagram of a triangular microphone array in a method for processing an audio signal in a vehicle according to an embodiment of the present application.

For example, referring to FIG. 5, three microphones A, B, and C are included in a triangular microphone array. The microphone A is used as a common microphone, the microphone A and the microphone B are located in the first sound zone, and the left part of the AB connection line is the first sound zone. The microphone A and the microphone C are located in the second sound zone, and the right part of the AC connection line is the second sound zone.

In one example, if the triangular microphone array is placed on the roof of the vehicle or in the middle of front and rear seats of the vehicle, the space within the vehicle can be divided into two sound zones by the left and right parts of the triangle, respectively. The two sound zones as divided are respectively directed to one seat in the front or rear row of the vehicle, which facilitates more accurate identification of sound sources of audio signals from the two seats.

Mode 2: if the microphone array is an N-gon, circular or matrix including a plurality of microphones, for each microphone in the microphone array, the microphone is set to locate in at least one sound zones, where N is an integer greater than 3.

Figure 6:
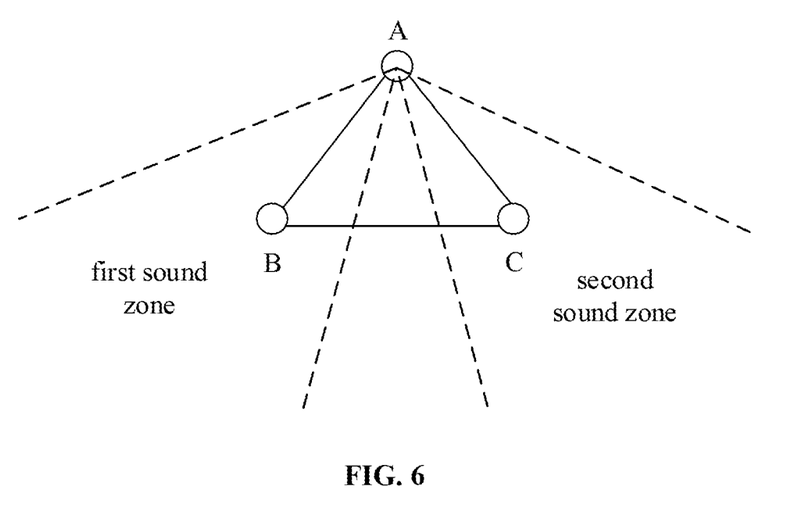
FIG. 6 shows a schematic diagram of a polygonal microphone array in a method for processing an audio signal in a vehicle according to an embodiment of the present application.

For example, referring to FIG. 6, four microphones A, B, C, and D are included in a polygonal microphone array. The microphone A and the microphone B are located the first sound zone, and the left part of the AB connection line is the first sound zone. The microphone C and the microphone D are located the second sound zone, and the right part of the CD connection line is the second sound zone.

Figure 7:
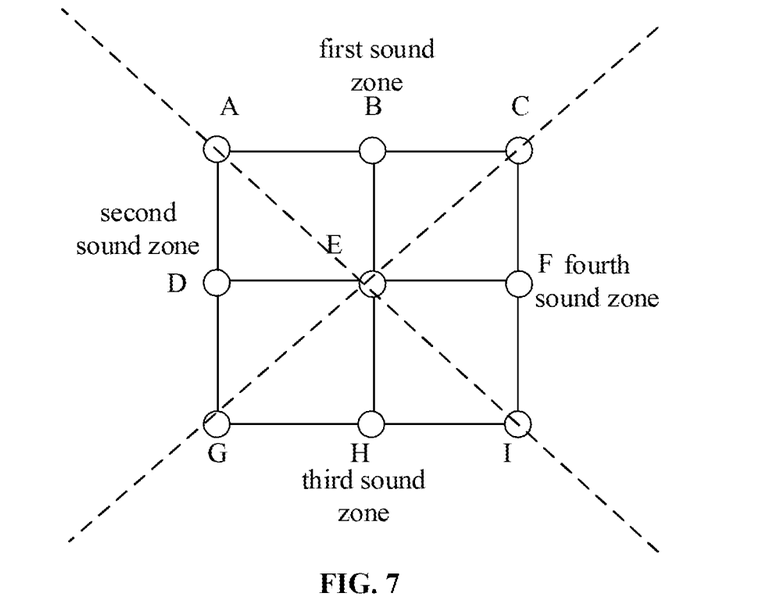
FIG. 7 shows a schematic diagram of a matrix-shaped microphone array in a method for processing an audio signal in a vehicle according to an embodiment of the present application.

For another example, referring to FIG. 7, a matrix-shaped microphone array includes nine microphones forming an array of 3*3, where E is a common microphone, A, B, C, and E are located in the first sound zone, A, D, G, and E are located in the second sound zone, G, H, I, and E are located in the third sound zone and C, F, I, and E are located in the fourth sound zone.

Figure 8:
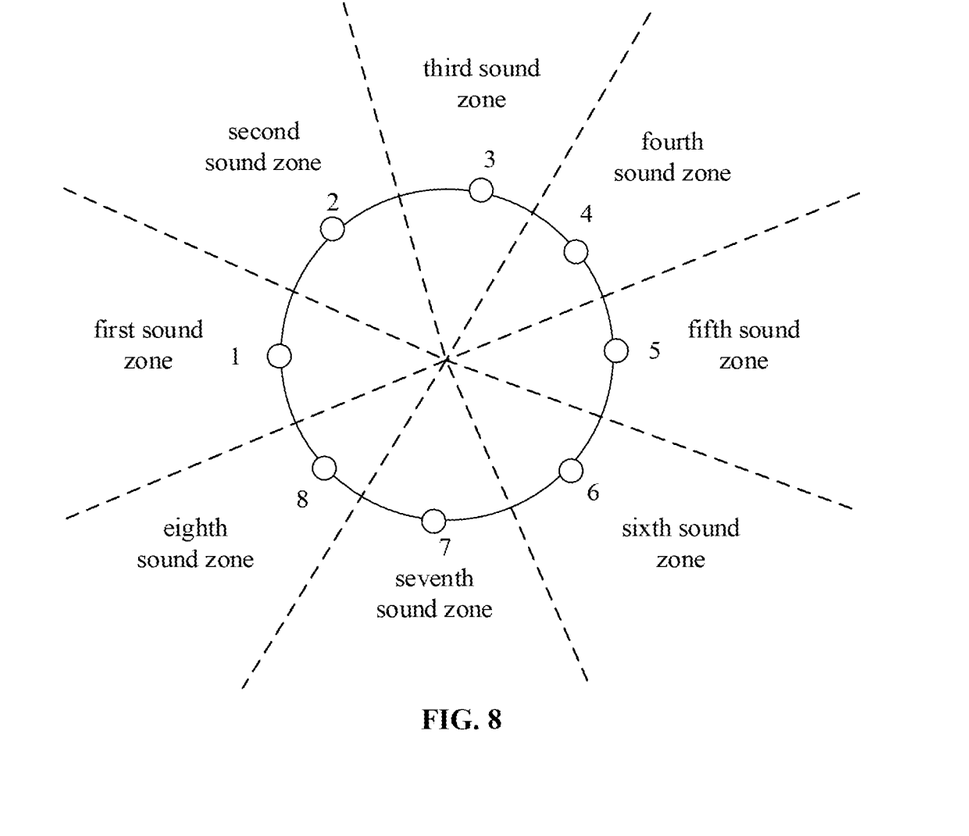
FIG. 8 shows a schematic diagram of a circular microphone array in a method for processing an audio signal in a vehicle according to an embodiment of the present application.

For another example, referring to FIG. 8, a circular microphone array includes eight microphones, and a sound zone in which each of the microphones in a circle is located can be set. For example, each of microphones 1 to 8 is located in the first to eighth regions respectively. In addition, it is also possible to group several adjacent microphones in the circle, and the microphones of the same group are set to be located in the same sound zone. For example, microphones 1 to 4 are located in the first sound zone, and microphones 5 to 8 are located in the second sound zone. For another example, microphones 1 to 4 are located in the first sound zone, microphones 4 to 7 are located in the second sound zone, and microphones 7 to 8 and 1 are located in the third sound zone.

In one possible implementation, S13 includes: performing the beamforming on the first processed signal based on the sound zone in which each microphone of the microphone array is located and a time when each microphone receives the audio signal, to determine a sound zone in which a sound source of the audio signal is located.

Due to the different positions of the microphones, times when the same audio signal reaches the microphones are different. Therefore, the beamforming (also known as beam forming) can be performed based on the sound zones in which each microphone is located and differences between times when the microphones receive the audio signal, to determine a sound zone in which a sound source of the audio signal is located.

In an example, the beamforming may be performed by using the sound zone in which each microphone in the microphone array is located, to weight a signal of each microphone, so as to enhance a signal of a specific sound zone, and weaken signals of other sound zones, thereby obtaining the signal from the specific sound zone.

In the embodiment of the present application, sound zones in which respective microphones in the microphone array are located may be set in advance, so that the beamforming can be performed on the audio signal directly based on the sound zones in which respective microphones are located. With this beamforming, the requirements for isolation degrees between different sound zones is not high, about 20 dB, and the sound source of the audio signal can be accurately determined.

In one example, assume that there is only one microphone array, since the microphones in the microphone array can be located in at least one sound zone, the beamforming and sound source localization can be accurately performed based on a sound zone to which each microphone in the microphone array is located, to accurately locate the sound source of the audio signal.

Figure 3:
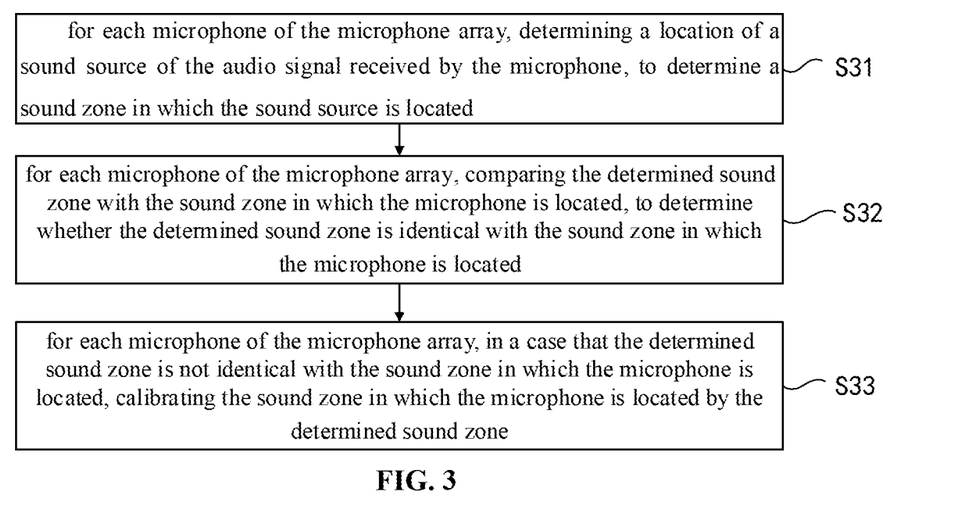
FIG. 3 shows a flowchart of a method for processing an audio signal in a vehicle according to an embodiment of the present application.

In one possible implementation, as shown in FIG. 3, the method further includes, for each microphone of the microphone array:

S31: determining a location of a sound source of the audio signal received by the microphone, to determine a sound zone in which the sound source is located;

S32: comparing the determined sound zone with the sound zone in which the microphone is located, to determine whether the determined sound zone is identical with the sound zone in which the microphone is located; and S33: in a case that the determined sound zone is not identical with the sound zone in which the microphone is located, calibrating the sound zone in which the microphone is located by the determined sound zone.

In one possible implementation, the determining a location of a sound source of the audio signal received by the microphone, to determine a sound zone in which the sound source is located for each microphone of the microphone array can be performed conventionally, for example, using time delay estimation.

In one possible implementation, S14 includes: sending the third processed signal to the on-board operation system of the vehicle via an Automotive Audio Bus.

The Automotive Audio Bus (A2B) can be implemented as a bus including complex audio lines, speaker lines, microphone lines and so on, to reduce various wires in a vehicle. By using the A2B, not only the number and weight of wires in the vehicle can be reduced, such that the wiring is simpler and more orderly, but also the space inside the vehicle can be increased to facilitate the adjustment of the positions and arrangement of various multimedia devices.

In one possible implementation, the signal obtained after the echo cancellation, beamforming, noise reduction, and signal amplification may be an audio digital signal. After the obtained audio digital signal is sent to an on-board operation system through an A2B, the on-board operation system may perform voice recognition on the received audio digital signal, and a voice recognition result is used to control various functions of the vehicle. For example, the voice recognition result is used to control one or more of functions such as calling, multimedia resource search, information query, and vehicle control.

Figure 4:
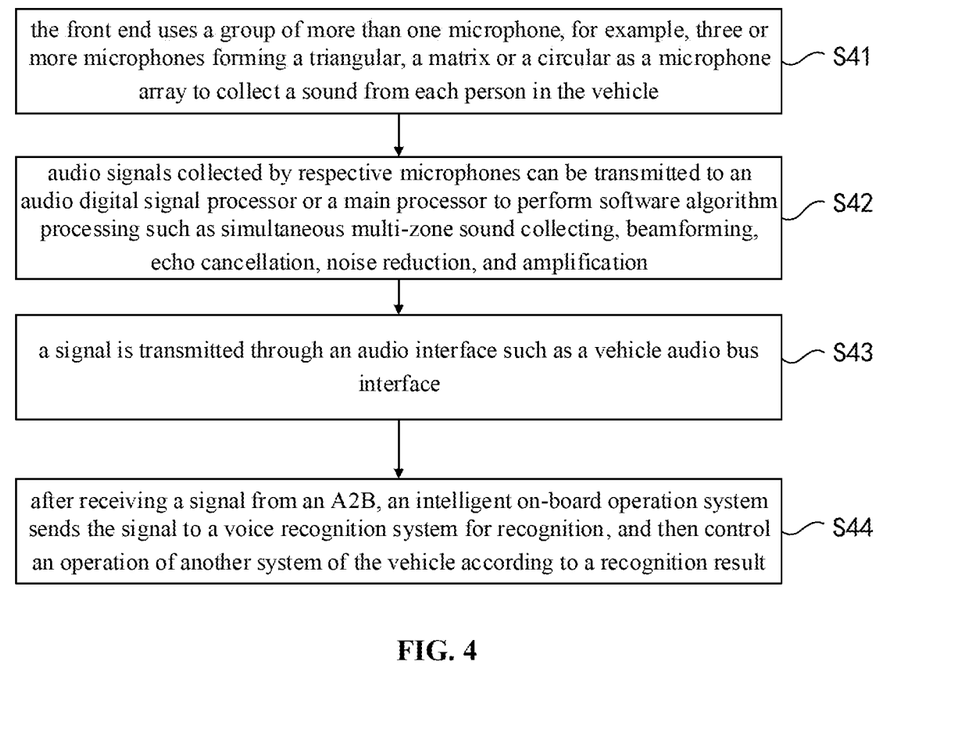
FIG. 4 shows a flowchart of an application example of a method for processing an audio signal in a vehicle according to an embodiment of the present application.

In an application example, as shown in FIG. 4, an on-board multi-zone noise reduction device collecting a sound by a microphone array is provided. The working principle of the on-board multi-zone noise reduction device collecting a sound by a microphone array is as follows.

In step S41, the front end uses a group of more than one microphone, for example, three or more microphones forming a triangular, a matrix or a circular as a microphone array to collect a sound from each person in the vehicle.

In step S42, audio signals collected by respective microphones can be transmitted to an audio digital signal processor or a main processor to perform software algorithm processing such as simultaneous multi-zone sound collecting, beamforming, echo cancellation, noise reduction, and amplification. In one example, it is possible to automatically determine which seat a sound is coming from when collecting the sound.

In step S43, a signal is transmitted through an audio interface such as a vehicle audio bus (A2B) interface. A signal is transmitted over a twisted-pair wire via a A2B interface. Not only audio data signals can be transmitted through an A2B, but also control signals and phantom power and the like can be supplied through the A2B. For example, an Inter-Integrated Circuit (I2C) control signal can be supplied through an A2B. Therefore, an A2B can greatly reduce the complexity of vehicle wiring and reduce the Bill of Material (BOM) cost of an on-board audio system. In addition, an A2B can ensure a high fidelity of audio signals, real-time audio transmission, while significantly reducing a weight of transmission cable bunch, thereby improving a vehicle fuel efficiency or battery life.

In step S44, after receiving a signal from an A2B, an intelligent on-board operation system may send the signal to a voice recognition system for recognition, and then control an operation of another system of the vehicle according to a recognition result. For example, if it is determined that a call is made to XX, a call system in the vehicle can be controlled to dial a telephone number of XX.

In this application example, a microphone array of a topology such as a triangle, a matrix or a circle is placed in the roof of the vehicle or in the middle of the front or rear seats of the vehicle, so that an on-board voice recognition system can better support a "car internet" on-board system. In this way, the on-board voice recognition system can better recognize an audio signal in an area for a passenger other than a main driver, and thus, the intelligent "car internet" on-board system can more conveniently and quickly serve passengers in the seats of the vehicle.

In addition, a noise reduction module is placed in a sound collecting module of the microphone array, to implement an on-board multi-zone noise reduction device collecting a sound by a microphone array, wherein a noise reduction module can reduce non-human sound such as sound of opening or closing a vehicle door, wind noise, engine sound, tire noise, other vehicle sound such as whistle, so that the on-board voice recognition system can better serve passengers in the seating areas of the vehicle. The intelligent "car Internet" on-board system includes a large amount of audio and video contents, information and other multimedia information. Voice control and call application are very important and commonly used functions of an on-board system. It is required to collect a voice signal from each seating area and perform a noise reduction process on it for voice recognition and call in the vehicle. The embodiment of the application can improve the voice recognition efficiency of an audio signal in the vehicle, thereby improving the user control experience, and implementing various on-board Internet services such as network search, audio and video on demand, information query, video call, and vehicle control.

Figure 9:
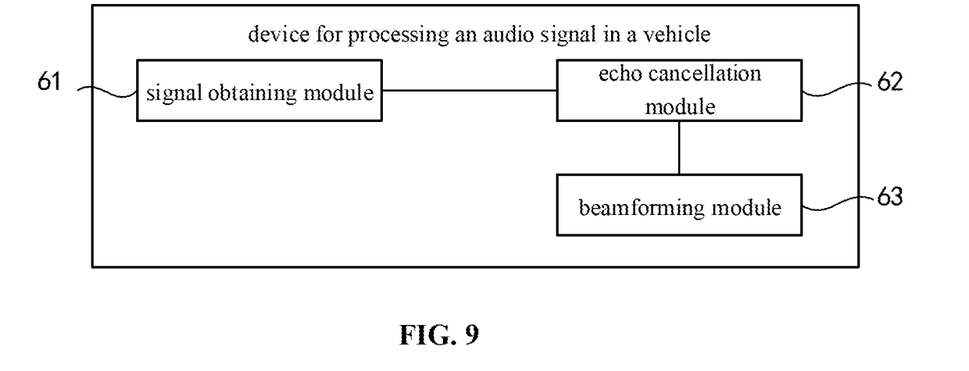
FIG. 9 shows a structural block diagram of a device for processing an audio signal in a vehicle according to an embodiment of the present application.

FIG. 9 shows a structural block diagram of a device for processing an audio signal in a vehicle according to an embodiment of the present application. As shown in FIG. 9, the device may include:

a signal obtaining module 61 configured to obtain an audio signal by a microphone array;

an echo cancellation module 62 configured to perform echo cancellation on the obtained audio signal, to obtain a first processed signal; and a beamforming module 63 configured to perform beamforming on the first processed signal according to sound zones in which microphones of the microphone array are located, to obtain a second processed signal, wherein the vehicle includes at least two sound zones, and each microphone of the microphone array is located in at least one sound zone.

Figure 10:
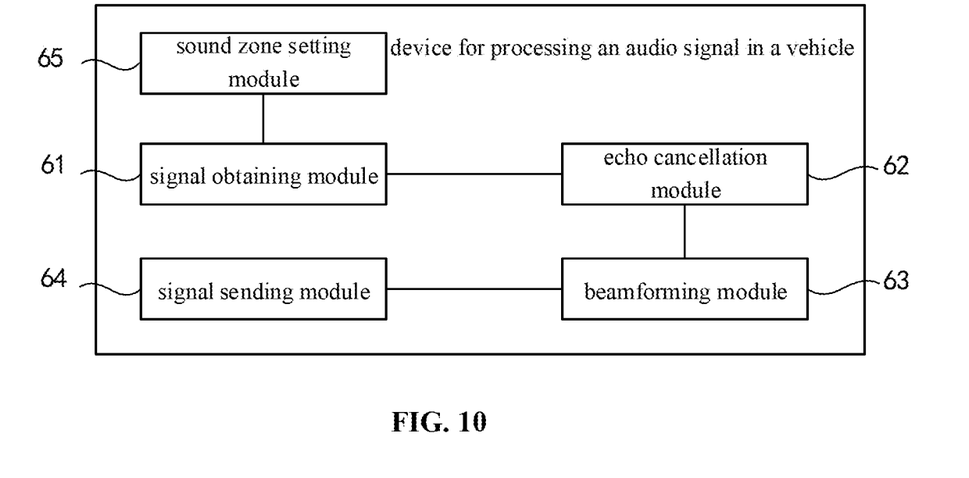
FIG. 10 shows a structural block diagram of a device for processing an audio signal in a vehicle according to an embodiment of the present application.

In one possible implementation, as shown in FIG. 10, the device further includes:

a signal sending module 64 configured to perform noise reduction and signal amplification on the second processed signal, to obtain a third processed signal, and send the third processed signal to an on-board operation system of the vehicle, to control the vehicle in response to the third processed signal.

In one possible implementation, the device further includes:

a sound zone setting module 65 configured to set the sound zones in which respective microphones of the microphone array is located, based on a topology of the microphone array.

In one possible implementation, the sound zone setting module 65 is further configured to set the sound zones in which respective microphones of the microphone array is located based on a topology of the microphone array by at least one of:

determining a first microphone as a microphone in common with the sound zones, setting a sound zone in which a second microphone is located to a first sound zone, and setting a sound zone in which a third microphone is located to a second zone, wherein the microphone array is a triangle including at least three microphones; and determining each microphone of the microphone array to be located in at least one sound zone, wherein the microphone array is an N-gon, a circle, or a matrix including a plurality of microphones, and N is an integer greater than 3.

In one possible implementation, the beamforming module 63 is further configured to perform the beamforming on the first processed signal based on the sound zone in which each microphone of the microphone array is located and a time when each microphone receives the audio signal, to determine a sound zone in which a sound source of the audio signal is located.

Figure 11:
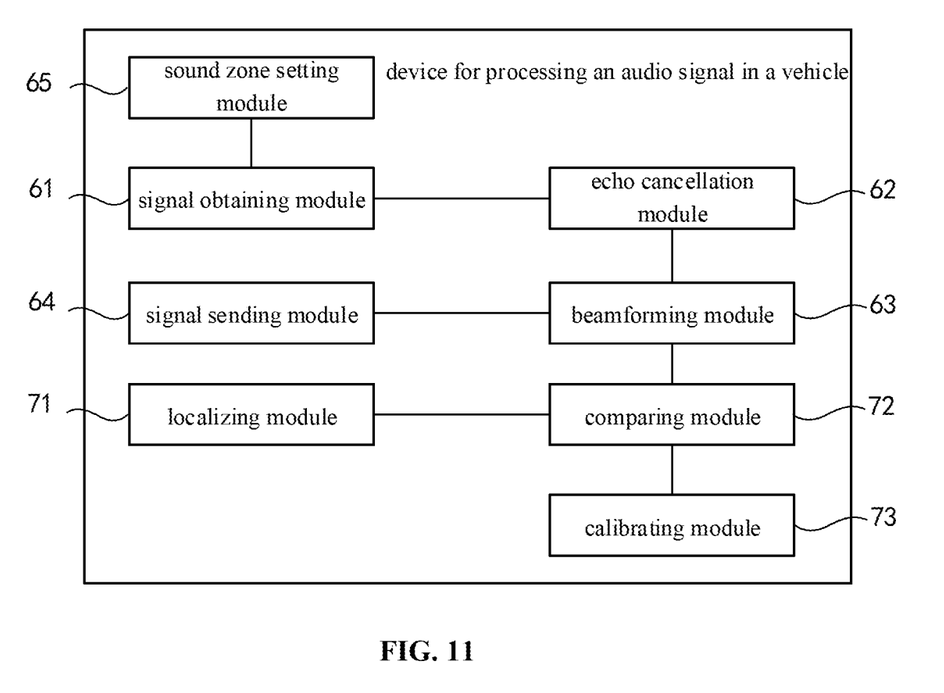
FIG. 11 shows a structural block diagram of a device for processing an audio signal in a vehicle according to an embodiment of the present application.

In one possible implementation, as shown in FIG. 11, the device further includes:

a localizing module 71 configured to, for each microphone of the microphone array, determine a location of a sound source of the audio signal received by the microphone, to determine a sound zone in which the sound source is located;

a comparing module 72 configured to, for each microphone of the microphone array, compare the determined sound zone with the sound zone in which the microphone is located, to determine whether the determined sound zone is identical with the sound zone in which the microphone is located; and;

a calibrating module 73 configured to, for each microphone of the microphone array, in a case that the determined sound zone is not identical with the sound zone in which the microphone is located, calibrate the sound zone in which the microphone is located by the determined sound zone.

In one possible implementation, the signal sending module 64 is further configured to send the third processed signal to the on-board operation system of the vehicle via an Automotive Audio Bus.

In this embodiment, functions of modules in the device refer to the corresponding description of the above mentioned method and thus the description thereof is omitted herein.

Figure 12:
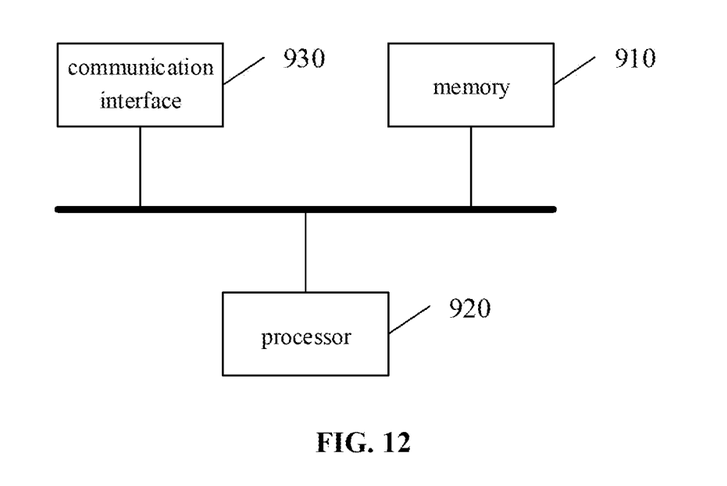
FIG. 12 shows a structural block diagram of an apparatus for processing an audio signal in a vehicle according to an embodiment of the present application.

FIG. 12 shows a structural block diagram of an apparatus for processing an audio signal in a vehicle according to an embodiment of the present application. As shown in FIG. 12, the apparatus includes a memory 910 and a processor 920. The memory 910 stores a computer program executable on the processor 920. When the processor 920 executes the computer program, the method for processing an audio signal in a vehicle in the foregoing embodiment is implemented. The number of the memory 910 and the processor 920 may be one or more.

The apparatus further includes:

a communication interface 930 configured to communicate with an external device and exchange data.

The memory 910 may include a high-speed RAM memory and may also include a non-volatile memory, such as at least one magnetic disk memory.

If the memory 910, the processor 920, and the communication interface 930 are implemented independently, the memory 910, the processor 920, and the communication interface 930 may be connected to each other through a bus and communicate with one another. The bus may be an Industry Standard Architecture (ISA) bus, a Peripheral Component (PCI) bus, an Extended Industry Standard Component (EISA) bus, or the like. The bus may be divided into an address bus, a data bus, a control bus, and the like. For ease of illustration, only one bold line is shown in FIG. 12, but it does not mean that there is only one bus or one type of bus.

Optionally, in a specific implementation, if the memory 910, the processor 920, and the communication interface 930 are integrated on one chip, the memory 910, the processor 920, and the communication interface 930 may implement mutual communication through an internal interface.

According to an embodiment of the present application, a computer-readable storage medium is provided for storing computer software instructions, which include programs involved in execution of the above the mining method.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A method for processing an audio signal in a vehicle, comprising:
obtaining an audio signal by a microphone array;
performing echo cancellation on the audio signal, to obtain a first processed signal; and
performing beamforming on the first processed signal according to sound zones in which microphones of the microphone array are located, to obtain a second processed signal, wherein the vehicle comprises at least two sound zones, and each microphone of the microphone array is located in at least one sound zone;
wherein the performing the beamforming on the first processed signal according to the sound zones in which the microphones of the microphone array are located, comprises:
performing the beamforming on the first processed signal based on the sound zone in which each microphone of the microphone array is located and differences between times when the microphones receives the audio signal, to determine the sound zone in which the sound source of the audio signal is located, such that a signal of each microphone in the microphone array is weighted, so as to enhance a signal of a specific sound zone and weaken signals of the other sound zones, thereby obtaining the signal from the specific sound zone;
wherein the microphone array is a matrix-shaped microphone array comprising nine microphones forming an array of 3*3; the nine microphones successively comprise a first microphone, a second microphone, a third microphone, a fourth microphone, a fifth microphone, a sixth microphone, a seventh microphone, an eighth microphone, and a ninth microphone; the first microphone, the second microphone, and the third microphone form a first row of the microphone array; the fourth microphone, the fifth microphone, and the sixth microphone form a second row of the microphone array; and the seventh microphone, the eighth microphone, and the ninth microphone form a third row of the microphone array; the fifth microphone is a common microphone; the first microphone, the second microphone, the third microphone, and the fifth microphone belong to a first sound zone; the first microphone, the fourth microphone, the seventh microphone, and the fifth microphone belong to the second sound zone; the seventh microphone, the eighth microphone, the ninth microphone, and the fifth microphone belong to the third sound zone; and the third microphone, the sixth microphone, the ninth microphone, and the fifth microphone belong to the fourth sound zone.

2. The method according to claim 1, further comprising:
performing noise reduction and signal amplification on the second processed signal, to obtain a third processed signal; and
sending the third processed signal to an on-board operation system of the vehicle, to control the vehicle in response to the third processed signal.

3. The method according to claim 2, wherein the sending the third processed signal to the on-board operation system of the vehicle, comprises:
sending the third processed signal to the on-board operation system of the vehicle via an Automotive Audio Bus.

4. A device for processing an audio signal in a vehicle, comprising:
one or more processors; and
a storage device configured for storing one or more programs, wherein
the one or more programs are executed by the one or more processors to enable the one or more processors to:
obtain an audio signal by a microphone array;
perform echo cancellation on the audio signal, to obtain a first processed signal; and
perform beamforming on the first processed signal according to sound zones in which microphones of the microphone array are located, to obtain a second processed signal, wherein the vehicle comprises at least two sound zones, and each microphone of the microphone array is located in at least one sound zone;
when the one or more programs are executed by the one or more processors to enable the one or more processors to perform the beamforming on the first processed signal according to the sound zones in which the microphones of the microphone array are located, the one or more programs are executed by the one or more processors to enable the one or more processors to specifically:
perform the beamforming on the first processed signal based on the sound zone in which each microphone of the microphone array is located and differences between times when the microphones receives the audio signal, to determine the sound zone in which the sound source of the audio signal is located, such that a signal of each microphone in the microphone array is weighted, so as to enhance a signal of a specific sound zone and weaken signals of the other sound zones, thereby obtaining the signal from the specific sound zone;
wherein the microphone array is a matrix-shaped microphone array comprising nine microphones forming an array of 3*3; the nine microphones successively comprise a first microphone, a second microphone, a third microphone, a fourth microphone, a fifth microphone, a sixth microphone, a seventh microphone, an eighth microphone, and a ninth microphone; the first microphone, the second microphone, and the third microphone form a first row of the microphone array; the fourth microphone, the fifth microphone, and the sixth microphone form a second row of the microphone array; and the seventh microphone, the eighth microphone, and the ninth microphone form a third row of the microphone array; the fifth microphone is a common microphone; the first microphone, the second microphone, the third microphone, and the fifth microphone belong to a first sound zone; the first microphone, the fourth microphone, the seventh microphone, and the fifth microphone belong to the second sound zone; the seventh microphone, the eighth microphone, the ninth microphone, and the fifth microphone belong to the third sound zone; and the third microphone, the sixth microphone, the ninth microphone, and the fifth microphone belong to the fourth sound zone.

5. The device according to claim 4, wherein the one or more programs are executed by the one or more processors to enable the one or more processors further to:
perform noise reduction and signal amplification on the second processed signal, to obtain a third processed signal; and
send the third processed signal to an on-board operation system of the vehicle, to control the vehicle in response to the third processed signal.

6. The device according to claim 5, wherein the one or more programs are executed by the one or more processors to enable the one or more processors further to send the third processed signal to the on-board operation system of the vehicle via an Automotive Audio Bus.

7. A non-transitory computer-readable storage medium, in which a computer program is stored, wherein the program, when executed by a processor, causes a vehicle to:
obtain an audio signal by a microphone array;
perform echo cancellation on the audio signal, to obtain a first processed signal; and
perform beamforming on the first processed signal according to sound zones in which microphones of the microphone array are located, to obtain a second processed signal, wherein the vehicle comprises at least two sound zones, and each microphone of the microphone array is located in at least one sound zone;
when the program, executed by a processor, causes a vehicle to perform the beamforming on the first processed signal according to the sound zones in which the microphones of the microphone array are located, the program, executed by a processor, causes a vehicle to specifically:
perform the beamforming on the first processed signal based on the sound zone in which each microphone of the microphone array is located and differences between times when the microphones receives the audio signal, to determine the sound zone in which the sound source of the audio signal is located, such that a signal of each microphone in the microphone array is weighted, so as to enhance a signal of a specific sound zone and weaken signals of the other sound zones, thereby obtaining the signal from the specific sound zone;
wherein the microphone array is a matrix-shaped microphone array comprising nine microphones forming an array of 3*3; the nine microphones successively comprise a first microphone, a second microphone, a third microphone, a fourth microphone, a fifth microphone, a sixth microphone, a seventh microphone, an eighth microphone, and a ninth microphone; the first microphone, the second microphone, and the third microphone form a first row of the microphone array; the fourth microphone, the fifth microphone, and the sixth microphone form a second row of the microphone array; and the seventh microphone, the eighth microphone, and the ninth microphone form a third row of the microphone array; the fifth microphone is a common microphone; the first microphone, the second microphone, the third microphone, and the fifth microphone belong to a first sound zone; the first microphone, the fourth microphone, the seventh microphone, and the fifth microphone belong to the second sound zone; the seventh microphone, the eighth microphone, the ninth microphone, and the fifth microphone belong to the third sound zone; and the third microphone, the sixth microphone, the ninth microphone, and the fifth microphone belong to the fourth sound zone.

8. The non-transitory computer-readable storage medium according to claim 7, wherein, when executed, the program causes the vehicle further to:

perform noise reduction and signal amplification on the second processed signal, to obtain a third processed signal; and send the third processed signal to an on-board operation system of the vehicle, to control the vehicle in response to the third processed signal.

9. The non-transitory computer-readable storage medium according to claim 8, wherein, when executed, the program causes the vehicle further to, when sending the third processed signal to the on-board operation system of the vehicle, send the third processed signal to the on-board operation system of the vehicle via an Automotive Audio Bus.

* * * * *